(12) United States Patent
Sakuma et al.

(10) Patent No.: US 11,196,533 B2
(45) Date of Patent: Dec. 7, 2021

(54) TIME SYNCHRONIZATION SYSTEM AND TIME SYNCHRONIZATION METHOD

(71) Applicant: Nippon Telegraph and Telephone Corporation, Tokyo (JP)

(72) Inventors: Hiroki Sakuma, Tokyo (JP); Kaoru Arai, Tokyo (JP); Ryuta Sugiyama, Tokyo (JP); Takaaki Hisashima, Tokyo (JP); Shunichi Tsuboi, Tokyo (JP); Osamu Kurokawa, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/968,062

(22) PCT Filed: Feb. 15, 2019

(86) PCT No.: PCT/JP2019/005663
§ 371 (c)(1),
(2) Date: Aug. 6, 2020

(87) PCT Pub. No.: WO2019/163679
PCT Pub. Date: Aug. 29, 2019

(65) Prior Publication Data
US 2021/0058223 A1 Feb. 25, 2021

(30) Foreign Application Priority Data
Feb. 20, 2018 (JP) .............................. JP2018-028292

(51) Int. Cl.
*H04L 7/00* (2006.01)
*G04G 7/00* (2006.01)
*G06F 1/14* (2006.01)

(52) U.S. Cl.
CPC ........... *H04L 7/0008* (2013.01); *G04G 7/005* (2013.01); *G06F 1/14* (2013.01)

(58) Field of Classification Search
CPC ......... H04L 7/0008; G06F 1/14; G04G 7/005; G01M 11/338; H04B 10/2581; H04B 10/07951
See application file for complete search history.

(56) References Cited

U.S. PATENT DOCUMENTS

| 2015/0085853 A1* | 3/2015 | Smith | .................... H04B 7/024 370/350 |
| 2018/0167299 A1* | 6/2018 | Karlsson | ............. H04L 41/0836 |

OTHER PUBLICATIONS

Sliwczvnski et al., "Fiber Optic Time Transfer for UTC-Traceable Synchronization for Telecom Networks." IEEE Communications Standards Magazine, Mar. 2017, 1(1):1-8.

* cited by examiner

*Primary Examiner* — Jamal Javaid
(74) *Attorney, Agent, or Firm* — Fish & Richardson P.C.

(57) ABSTRACT

[Problem] To synchronize timings of transmitting and receiving a pulse signal (1 PPS signal) at a constant interval between communication apparatuses even in a case where an optical fiber connecting the communication apparatuses fluctuates in an optical characteristic and an optical fiber length.

[Solution] The time synchronization system 20 transmits and receives a pulse signal at a constant interval between a local apparatus L (apparatus L) and a remote apparatus R (apparatus R) connected through the two-core bidirectional optical fibers F1 and F2 to synchronize time. A propagation delay amount τ1 in the fiber F1 is calculated, from a proportional relationship between T1 and T2 and a proportional relationship of τud and τ1, where T1 represents a propagation delay time difference between a pulse signals P1 and P4 of an identical wavelength $\lambda_1$ returned after transmitting a pulse signal P1 of wavelength $\lambda_1$ and a pulse signal P2 of wavelength $\lambda_2$ different from $\lambda_1$ to the remote apparatus R, T2 represents a propagation delay time difference between the pulse signal P1 of wavelength $\lambda_1$ and a pulse signal P3 of wavelength $\lambda_2$, and τud represents the round-trip delay time between the apparatuses L and R. The pulse signals P1 and P2 are transmitted with a time difference td corresponding to a difference between the current and last calculated propagation delay amounts τ1 being set so that the difference is zero.

4 Claims, 8 Drawing Sheets

TIME SYNCHRONIZATION SYSTEM AND TIME SYNCHRONIZATION METHOD

CROSS-REFERENCE TO RELATED APPLICATIONS

This application is a National Stage application under 35 U.S.C. § 371 of International Application No. PCT/JP2019/005663, having an International Filing Date of Feb. 15, 2019, which claims priority to Japanese Application Serial No. 2018-028292, filed on Feb. 20, 2018. The disclosure of the prior application is considered part of the disclosure of this application, and is incorporated in its entirety into this application.

TECHNICAL FIELD

The present invention relates to a time synchronization system and a time synchronization method for synchronizing time with high accuracy between communication apparatuses which are separately disposed at remote locations and connected to each other by optical fibers.

BACKGROUND ART

Non Patent Literature 1 describes technical contents of the field described above. Specifically, between communication apparatuses connected to each other by optical fibers, a 1 PPS (pulse/second) signal emitted by one pulse per second is transmitted from communication apparatus on a transmitting side (also referred to as the transmitting side) to the communication apparatus on a receiving side (also referred to as the receiving side) through the optical fibers. Non Patent Literature 1 describes a technique called Optical Time Transfer (OTT) that shares a 1 PPS signal timing between communication apparatuses. In a time transmission method using this optical fiber, very high accuracy time synchronization is achieved with time error of approximately tens of ps between communication apparatuses connected by an optical fiber link of approximately 500 km.

However, optical characteristics of optical fibers such as wavelength dispersion coefficients and refractive indices fluctuate (characteristic fluctuation) mainly in accordance with changes in environmental temperature, and an optical fiber length varies. In a case where this characteristic fluctuation occurs, since a propagation time (or propagation delay time) of a 1 PPS signal to the receiving side fluctuates, the transmitting side adds delay to the 1 PPS signal to cancel out this fluctuation such that the receiving side can receive the 1 PPS signal at a timing synchronized with the transmitting side. This technique is further described.

As illustrated in FIG. 7, one (one core) optical fiber 13 that connects between the communication apparatuses 11 and 12 is capable of bidirectional (one-core bidirectional) communication as indicated by arrows Y1 and Y2. In this case, a 1 PPS signal 14 is transmitted from a communication apparatus 11 on the transmitting side (transmitting side) through the optical fiber 13 to a communication apparatus 12 on the receiving side (receiving side) as indicated by the arrow Y1. This transmitted 1 PPS signal 14, after received by the receiving side 12, is transmitted back to be received by the transmitting side 11 as indicated by the arrow Y2. The transmitting side 11 divides a round-trip propagation time (propagation delay amount) of the received 1 PPS signal 14 by 2, compares ½ of the propagation delay amount with a reference one-way propagation delay amount, and determines, from a difference between these amounts, a deviation of propagation due to the characteristic fluctuation of the optical fiber 13.

On the receiving side 12, a reception timing of the 1 PPS signal 14 is deviated by that propagation deviation from a transmission timing of the 1 PPS signal 14. Thus, the transmitting side 11 delays the 1 PPS signal 14 based on the amount of propagation deviation and transmits the delayed signal to the receiving side 12 so that the deviation is corrected by the receiving side 12. This allows time synchronization in which the 1 PPS signal 14 is transmitted and received at the timing synchronized between the transmitting and receiving sides 11 and 12.

CITATION LIST

Non Patent Literature

Non Patent Literature 1: L. Sliwczynski et al, IEEE Commun. Standards Mag., 1(1), pp. 66-73, 2017.

SUMMARY OF THE INVENTION

Technical Problem

However, when time synchronization is performed one-core bidirectionally as described above, the one-core optical fiber 13 is required to be occupied, and thus, is difficult to apply between the communication apparatuses already depleted of core wires. In order to expand an application area, a two-core bidirectional time transmission method is required that is commonly applied in optical relay transmission systems. In addition, the occupation of the one-core optical fiber 13 causes the introduction costs to be very high.

As illustrated in FIG. 8, the two-core bi-directional scheme is configured such that the communication apparatuses 11 and 12 separately disposed at remote locations perform uplink and downlink bidirectional (two-core bidirectional) transmissions indicated by the arrows Y1 and Y2 through two (two cores) independent optical fibers 13a and 13b. In the case of the two-core bidirectional scheme, since the characteristics of the optical fibers 13a and 13b individually fluctuate, the propagation delay amount in each of the optical fibers 13a and 13b cannot be obtained even if a round-trip delay time is divided by 2 as in the one-core bidirectional scheme described above. For this reason, there is a problem in that the 1 PPS signal cannot be transmitted and received at the timing synchronized between the transmitting and receiving sides in the two-core bidirectional scheme.

The present invention has been made in consideration of such a circumstance, and has an object to provide a time synchronization system and a time synchronization method for synchronizing timings of transmitting and receiving a pulse signal (1 PPS signal) at a constant interval between communication apparatuses even in a case where an optical fiber connecting the communication apparatuses fluctuates in an optical characteristic and an optical fiber length.

Means for Solving the Problem

As an measure for solving the above-described problems, the invention according to claim 1 is a time synchronization system for transmitting and receiving a pulse signal at a constant interval at a synchronization timing between first and second communication apparatuses connected through a first optical fiber and a second optical fiber, which are two-core bidirectional, to synchronize time, the time synchronization system including: the first communication apparatus that includes a first transmitter configured to transmit a first pulse signal of a first wavelength and a second pulse signal of a second wavelength different from the first wavelength to the second communication apparatus through the first optical fiber, and a first receiver configured to receive a plurality of pulse signals including the first pulse signal and the second pulse signal transmitted from the second communication apparatus through the second optical fiber; and the second communication apparatus that includes a second receiver configured to receive the first pulse signal and the second pulse signal from the first optical fiber, and a second transmitter configured to generate a third pulse signal of a wavelength identical to the wavelength of the second pulse signal when receiving the first pulse signal, and to simultaneously transmit the first pulse signal and the third pulse signal to the first communication apparatus through the second optical fiber, and generate a fourth pulse signal of a wavelength identical to the wavelength of the first pulse signal when receiving the second pulse signal to simultaneously transmit the second pulse signal and the fourth pulse signal to the first communication apparatus through the second optical fiber, wherein the first communication apparatus further includes a calculating unit configured to calculate a propagation delay amount in the first optical fiber from a proportional relationship between a propagation delay time difference between the first pulse signal and the fourth pulse signal of the identical first wavelength received by the first receiver and a propagation delay time difference between the first pulse signal of the first wavelength and the third pulse signal of the second wavelength that is different from the first wavelength, and a proportional relationship between a round-trip delay time in the first and second optical fibers and a propagation delay amount in the first optical fiber, and a control unit configured to control the first pulse signal and the second pulse signal to be transmitted from the first transmitter with a time difference corresponding to a difference between current and last values of the calculated propagation delay amounts so that the difference is zero.

The invention according to claim 3 is a time synchronization method by a time synchronization system for transmitting and receiving a pulse signal at a constant interval at a synchronization timing between first and second communication apparatuses connected through a first optical fiber and a second optical fiber, which are two-core bidirectional, to synchronize time, the time synchronization method including: transmitting, from the first communication apparatus, a first pulse signal of a first wavelength and a second pulse signal of a second wavelength different from the first wavelength to the second communication apparatus through the first optical fiber; receiving, at the second communication apparatus, the first pulse signal and the second pulse signal from the first optical fiber; generating a third pulse signal of a wavelength identical to the wavelength of the second pulse signal when receiving the first pulse signal, and simultaneously transmitting the first pulse signal and the third pulse signal to the first communication apparatus through the second optical fiber; generating a fourth pulse signal of a wavelength identical to the wavelength of the first pulse signal when receiving the second pulse signal, and simultaneously transmitting the second pulse signal and the fourth pulse signal to the first communication apparatus through the second optical fiber; receiving the first to fourth pulse signals from the second optical fiber at the first communication apparatus; calculating a propagation delay amount in the first optical fiber from a proportional relationship between a propagation delay time difference between the first pulse signal and the fourth pulse signal of the identical first wavelength among the received first to fourth pulse signals and a propagation delay time difference between the first pulse signal of the first wavelength and the third pulse signal of the second wavelength that is different from the first wavelength, and a proportional relationship between a round-trip delay time in the first and second optical fibers and a propagation delay amount in the first optical fiber, and controlling the first pulse signal and the second pulse signal to be transmitted to the second transmitter with a time difference corresponding to a difference between current and last values of the calculated propagation delay amounts such that the difference is zero.

According to the configuration according to claim 1 and the method according to claim 3 described above, the first and fourth pulse signals of the identical first wavelength received through the second optical fiber in the first communication apparatus are equal to each other in the propagation delay amount in the second optical fiber, and thus, is equal to the propagation delay time difference (T1) between the first and second pulse signals delayed in propagations in the first optical fiber. On the other hand, both the first pulse signal of the first wavelength and the third pulse signal of the second wavelength different from the first wavelength that are received are simultaneously transmitted from the second communication apparatus, and thus, the reception time difference between the both signals is the propagation delay time difference (T2) of the both signals in the second optical fiber. Assume that the round-trip delay time (round-trip propagation delay time) of the first and second optical fibers is τud, and the propagation delay amount in the first optical fiber is τ1.

The propagation delay amount τ1 in the first optical fiber F1 is calculated from a proportional relationship between T1 and T2, and a proportional relationship between τud and τ1, that is, $\tau 1 = \{T1/(T1+T2)\} \times \tau ud$. When the first pulse signal and the second pulse signal are transmitted in the first optical fiber with the time difference corresponding to a difference between the current and last calculated propagation delay amounts τ1 so that the difference is zero, corrected is the deviation in the reception synchronization timing in the second communication apparatus due to the propagation delay amount in the first optical fiber. This allows the timings of transmitting and receiving a pulse signal (1 PPS signal) at a constant interval to be synchronized between the first and second communication apparatuses even in a case where an optical fiber connecting the communication apparatuses fluctuates in an optical characteristics and an optical fiber length.

The invention according to claim 2 is the time synchronization system according to claim 1, wherein the control unit performs a first control of the first pulse signal and the second pulse signal to be simultaneously transmitted to the first optical fiber at a beginning of transmitting and receiving the pulse signals between the first and second communication apparatuses, and performs a second control of the first pulse signal and the second pulse signal to be transmitted with a time difference corresponding to a difference between the propagation delay amount in the first optical fiber calculated by the calculating unit according to the first control and a predetermined propagation delay amount, serving as a reference, in the first optical fiber such that the difference is zero.

According to this configuration, at the beginning of the time synchronization process, the propagation delay amount in the first optical fiber is calculated using the first and second pulse signals transmitted from the first communication apparatus with a difference of 0, and the third and fourth pulse signals generated in the second communication apparatus. The first and second pulse signals are transmitted from the first communication apparatus with the time difference corresponding to a difference between the calculated propagation delay amount and the reference propagation delay amount in the first optical fiber so that the difference is zero. Thus, the time synchronization process for the transmission and reception between the communication apparatuses can be appropriately performed after the beginning.

Effects of the Invention

According to the present invention, it is possible to provide a time synchronization system and a time synchronization method for synchronizing timings of transmitting and receiving a pulse signal (1 PPS signal) at a constant interval between communication apparatuses even in a case where an optical fiber connecting the communication apparatuses fluctuates in an optical characteristic and an optical fiber length.

DESCRIPTION OF EMBODIMENTS

Hereinafter, an embodiment according to the present invention will be described with reference to the drawings.

Figure 1:
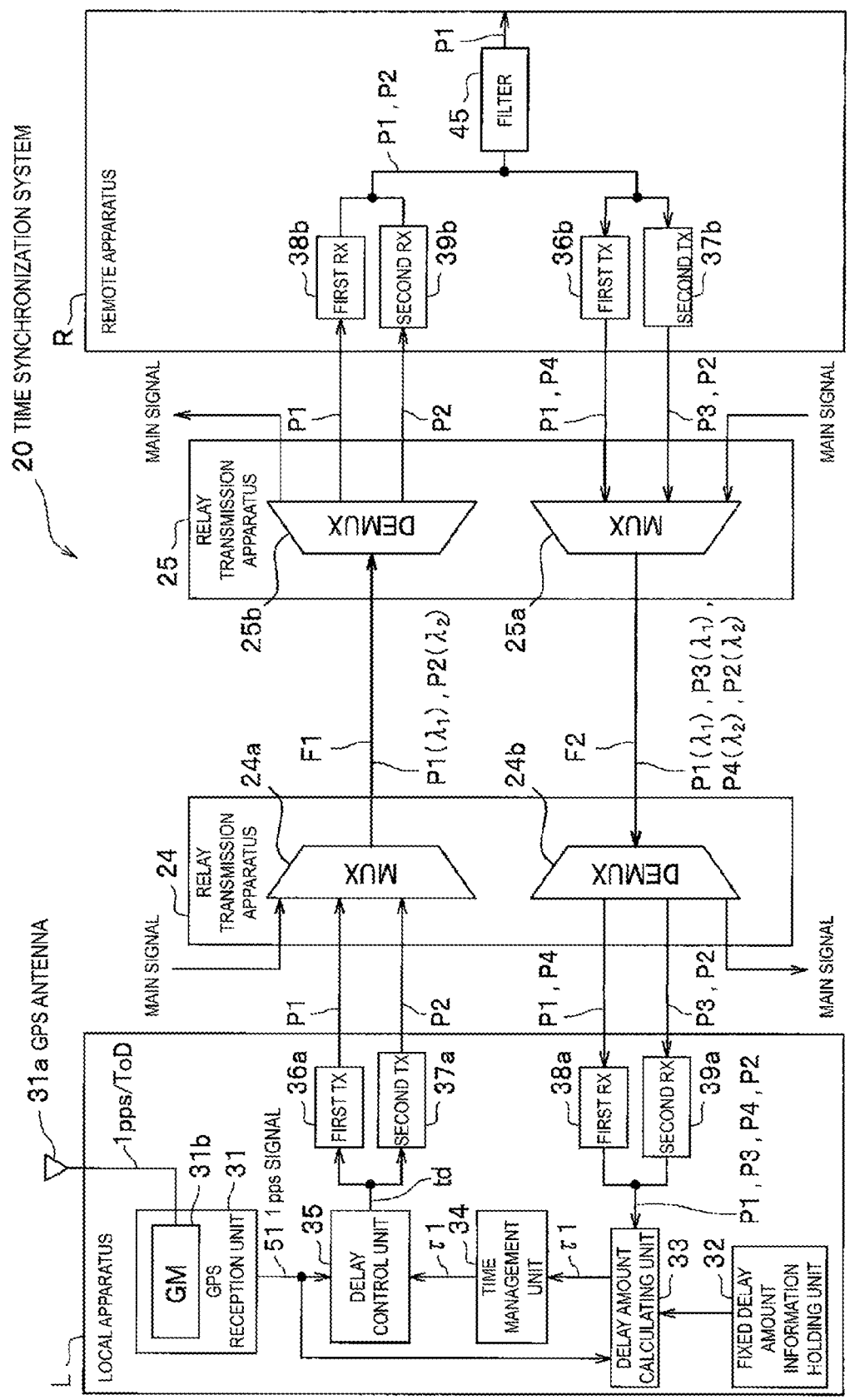
FIG. 1 is a block diagram illustrating a configuration of a time synchronization system according to an embodiment of the present invention.

FIG. 1 is a block diagram illustrating a configuration of a time synchronization system according to an embodiment of the present invention.

A time synchronization system 20 illustrated in FIG. 1 performs time synchronization for transmitting and receiving a 1 PPS signal at a timing synchronized between transmitting and receiving sides, and is configured such that a local apparatus L and a remote apparatus R which are communication apparatuses separately disposed at remote locations are connected by two two-core bidirectional optical fibers F1 and F2. The optical fibers F1 and F2 differs in length, and one end of each fibers is connected to the local apparatus L via a relay transmission apparatus 24, and the other end is connected to the remote apparatus R via a relay transmission apparatus 25. The optical fiber F1 is also referred to as a first optical fiber F1 and an optical fiber F2 as a second optical fiber F2. Note that the local apparatus L constitutes a first communication apparatus described in the claims, and the remote apparatus R constitutes a second communication apparatus described in the claims.

Figure 2:
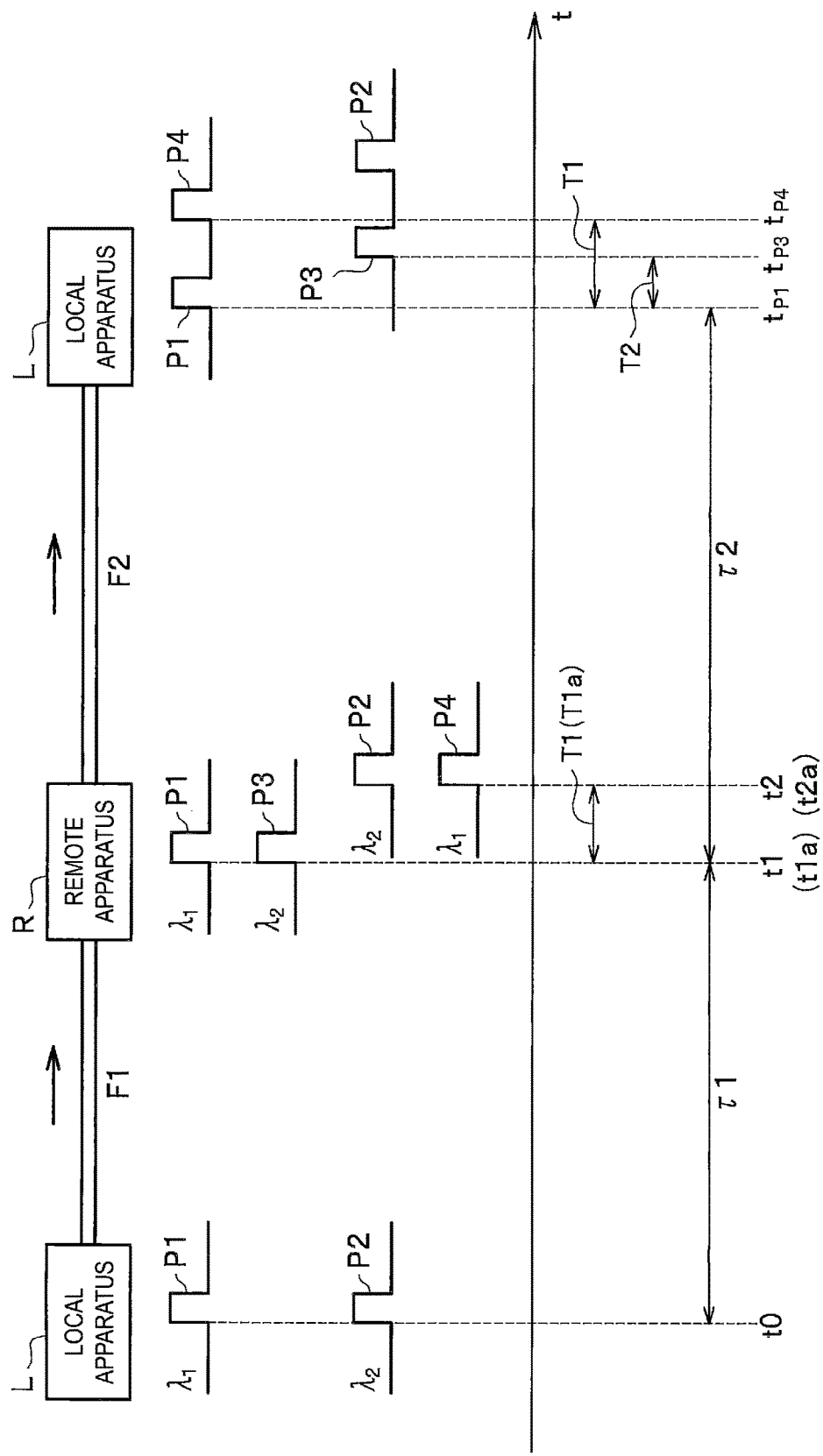
FIG. 2 is a diagram illustrating a local apparatus and a remote apparatus connected by two-core bidirectional optical fibers illustrated in FIG. 1 in one direction from the left to the right of the drawing.

Principles of the Invention Hereinafter, principles of the present invention will be described with reference to FIG. 2. FIG. 2 is a diagram illustrating the local apparatus L and the remote apparatus R connected by the two-core bidirectional optical fibers F1 and F2 illustrated in FIG. 1 in one direction from the left to the right of the drawing. Note that, in describing the principles, assume that a propagation delay of the pulse signal is produced only by the optical fibers F1 and F2 that are round-trip between the local apparatus L and the remote apparatus R.

As illustrated in FIG. 1, the local apparatus L includes a Global Positioning System (GPS) reception unit 31 including a Grand Master (GM: time reference device) 31$b$ to which a GPS antenna 31$a$ is connected. The local apparatus L uses a 1 PPS signal received by the GM 31$b$ via the GPS antenna 31$a$ as a reference of time to transmit two pulse signals P1 and P2 in synchronization with the reference 1 PPS signal to the first optical fiber F1, the pulse signals P1 and P2 being different in wavelengths. As illustrated in FIG. 2, the pulse signal P1 has a unique wavelength $\lambda_1$ and the pulse signal P2 has a unique wavelength $\lambda_2$ different from the wavelength $\lambda_1$. Assume that the wavelength $\lambda_2$ causes greater the propagation delay than the wavelength $\lambda_1$.

The local apparatus L simultaneously transmits the pulse signal P1 of wavelength $\lambda_1$ and the pulse signal P2 of wavelength $\lambda_2$ through the first optical fiber F1 to the remote apparatus R at a time t0 illustrated in FIG. 2, As for arrival times of the pulse signals P1 and P2 to the remote apparatus R, the wavelength $\lambda_2$ of the pulse signal P2 causes greater the propagation delay than the wavelength $\lambda_1$ of the pulse signal P1, and thus, an arrival time t2 of the pulse signal P2 is later than an arrival time t1 of the pulse signal P1. In this way, a difference occurs in the propagation delay time between the pulse signals P1 and P2.

This difference in the propagation delay time will be described in detail. Since the wavelength $\lambda_2$ of the pulse signal P2 causes greater the propagation delay than the wavelength $\lambda_1$ of the pulse signal P1, the wavelength $\lambda_2$ has a greater refractive index n represented by Expression (1) below than the wavelength $\lambda_1$.

$$(n \times l)/c \qquad (1)$$

where n represents a refractive index of the optical fiber, l represents a length of the optical fiber, and c represents a speed of light.

In other words, the wavelength $\lambda_2$ of the pulse signal P2 has the greater refractive index n and thus causes greater propagation delay, which results in later arrival time to the remote apparatus R than the pulse signal P1. Thus, after the pulse signal P1 of the wavelength $\lambda_1$ arrives at the time t1 illustrated in FIG. 2, the pulse signal P2 of the wavelength $\lambda_2$ arrives at the time t2 that is later by a time period T1 than the time t1. Note that the arrival referred here is assumed to be the same time as a time point when the signal is received by the remote apparatus R. T1 is a difference between the propagation delay times of the pulse signal P1 and the pulse signal P2.

The remote apparatus R generates a pulse signal P3 of wavelength $\lambda_2$ identical to the wavelength of the pulse signal P2 when receiving the pulse signal P1 at the time t1 illustrated in FIG. 2, and transmits simultaneously the pulse signal P1 of wavelength $\lambda_1$ and the pulse signal P3 of wavelength $\lambda_2$ back to the local apparatus L through the second optical fiber F2 at a time t1a. The time t1a of transmission is actually delayed more than the arrival time t1, but for facilitating easy understanding, illustrated at the same timing as the arrival time t1 in FIG. 2. This similarly applies to other pulse signals P2 and P4.

The remote apparatus R generates the pulse signal P4 of wavelength $\lambda_1$ when receiving the pulse signal P2 of wavelength $\lambda_2$ illustrated at the time t2, and transmits simultaneously the pulse signal P2 of wavelength $\lambda_2$ and the pulse signal P4 of wavelength $\lambda_1$ back to the local apparatus L through the second optical fiber F2 at a time t2a.

In the pulse signals P1 to P4 that are transmitted back in this manner, the pulse signals P1 and P4 of the one identical wavelength $\lambda_1$ are the same in the wavelength, and thus, are the same in the propagation delay amount $\tau 2$ in the second optical fiber F2. The pulse signals P2 and P3 of the other identical wavelength $\lambda_2$ are the same in the propagation delay amount $\tau 2$ in the second optical fiber F2, but are different in the propagation delay amount $\tau 2$ because the pulse signals P2 and P3 are different in the wavelength from the pulse signals P1 and P4 of the one wavelength $\lambda_1$. The propagation delay amount is, in other words, a propagation delay time.

The above transmitted pulse signals P1 to P4 are received by the local apparatus L. Reception times of these signals are a time $t_{p1}$ for the pulse signal P1, a time $t_{p3}$ for the pulse signal P3, and a time $t_{p4}$ for the pulse signal P4. However, the time $t_{p1}$ is also a propagation time (referred to as a propagation delay time) from a time when the pulse signal P1 is transmitted from the remote apparatus R to a time when the pulse signal P1 is received by the local apparatus L through the second optical fiber F2 (that is, one-way trip between the remote apparatus R and the local apparatus L). Similarly, the time $t_{p3}$ is also a propagation time of the pulse signal P3 between the remote apparatus R and the local apparatus L, and the time $t_{p4}$ is also a propagation time of the pulse signal P4 between the remote apparatus R and the local apparatus L.

Both the pulse signals P1 and P4 of the identical wavelength $\lambda_1$ received by the local apparatus L are equal to each other in the propagation delay amount $\tau 2$ in the second optical fiber F2, and thus, are different in the reception time by the time difference T1 that is the same as the transmission time difference T1a between the pulse signals P1 and P4 from the remote apparatus R. The reception time difference T1 is equal to the reception time difference T1 at the remote apparatus R between the pulse signals P1 and P2 delayed in propagation in the first optical fiber F1. In other words, this difference is equal to a difference between the propagation delay times of the pulse signals P1 and P2 (=T1) in the first optical fiber F1.

On the other hand, the pulse signals P1 and P3 different in the wavelengths $\lambda_1$ and $\lambda_2$ received by the local apparatus L have been transmitted simultaneously at the time t1a from the remote apparatus R. Thus, a reception time difference T2 between the pulse signals P1 and P3 at the local apparatus L is a difference between the propagation delay times of the pulse signals P1 and P3 (=T2) in the second optical fiber F2.

A propagation delay amounts $\tau 1$ and $\tau 2$ (see FIG. 2) in the optical fibers F1 and F2, respectively are determined from a ratio between the propagation delay time difference T1 in the first optical fiber F1 and the propagation delay time difference T2 in the second optical fiber F2, a proportional relation of the round-trip delay time $\tau ud$ of the pulse signals in the optical fibers F1 and F2. In this case, the propagation delay amount $\tau 1$ in the first optical fiber F1 is determined by Equation (2) below.

$$\tau 1 = \{T1/(T1+T2)\} \times \tau ud \qquad (2)$$

where $\tau ud$ represents the round-trip propagation delay time through the optical fibers F1 and F2 between the local apparatus L and the remote apparatus R.

The propagation delay amounts $\tau 1$ and $\tau 2$ are determined from the time $t_{p1}$ for the pulse signal P1, the time $t_{p3}$ for the pulse signal P3, and the time $t_{p4}$ for the pulse signal P4 in the second optical fiber F2 illustrated in FIG. 2. Thus, the propagation delay amount $\tau 1$ in the first optical fiber F1 is determined by the following Formula (3) based on the propagation times $t_{p1}$, $t_{p3}$, and $t_{p4}$.

[Expression 1]

$$\tau 1 = \frac{-t_{P1} + -t_{P4}}{-2t_{P1} + t_{P3} + t_{P4}} t_{P1} \qquad (3)$$

Where a propagation delay amount $\tau 1S$ in the first optical fiber F1 in consideration of the Sagnac effect described later is determined by Equation (4) below. Here, $\tau_s$ is a deviation in time due to the Sagnac effect.

[Expression 2]

$$\tau 1S = \frac{-t_{P1} + t_{P4}}{-2t_{P1} + t_{P3} + t_{P4}} t_{P1} \pm \tau_S \qquad (4)$$

The Sagnac effect is an effect in which the position of the target device, such as the remote apparatus R, varies due to the rotation of the Earth, and thus, the arrival time of the transmission signal to the target device varies. For example, consider a case where the pulse signal P1 is transmitted from the local apparatus L to the remote apparatus R. In this case, assume that the Earth's rotation causes the remote apparatus R to move in a direction opposite to the transmission direction of the pulse signal P1 transmitted from the local apparatus L. At this time, since the remote apparatus R moves toward the pulse signal P1 coming toward the remote apparatus R, the arrival time of the pulse signal P1 to the remote apparatus R becomes earlier (shortened). In the reverse case, it becomes later (lengthened).

Since the propagation delay amount $\tau 1$ in the first optical fiber F1 can be determined as described above, the local apparatus L may shift transmission timings of the pulse signals P1 and P2 based on the propagation delay amount $\tau 1$ to correct the deviation in a reception synchronization timing due to the propagation delay amount $\tau 1$ in the remote apparatus R. This allows time synchronization in which the pulse signals P1 and P2 are transmitted and received in synchronization with the 1 PPS signal at the timing synchronized between the local apparatus L and the remote apparatus R.

Hereinafter, the pulse signal P1 is also referred to as a first pulse signal P1; the pulse signal P2, a second pulse signal P2; the pulse signal P3, a third pulse signal P3; and the pulse signal P4, a fourth pulse signal P4.

Configuration of Embodiment

In describing the present embodiment, it is assumed that there is no wavelength difference or delay time difference between the pulse signals of the wavelength $\lambda_1$ and the wavelength $\lambda_2$ in the optical components of the local apparatus L and the remote apparatus R, and the temperature and optical characteristics are equal between the two-core optical fibers F1 and F2.

As illustrated in FIG. 1, the local apparatus L is configured to include the GPS reception unit 31, a fixed delay amount information holding unit (also referred to as a holding unit) 32, a delay amount calculating unit 33, and a time management unit 34, a delay control unit 35, a first TX (transmitter) 36a, a second TX 37a, a first RX (receiver) 38a, and a second RX 39a. Note that the delay amount calculating unit 33 constitutes a calculating unit described in the claims, and the delay control unit 35 constitutes a control unit described in the claims. The first TX 36a and the second TX 37a constitutes a first transmitter described in the claims. The first RX 38a and the second RX 39a constitutes a first receiver described in the claims.

The remote apparatus R is configured to include a first RX 38b, a second RX 39b, a first TX 36b, a second TX 37b, and a filter 45. Connected output ends of the first RX 38b and the second RX 39b and connected output ends of the first TX 36b and the second TX 37b are connected to an input end of the filter 45. The output end of the filter 45 is connected to a local apparatus (not illustrated) of the latter stage, a subsequent latter stage of the local apparatus, a remote apparatus (not illustrated) is connected to, and this configures a dependent connection. Note that the first TX 36b and the second TX 37b constitutes a second transmitter described in the claims. The first RX 38b and the second RX 39b constitutes a second receiver described in the claims.

The relay transmission apparatus 24 on the local apparatus L side includes a MUX 24a and a DEMUX 24b. The relay transmission apparatus 25 on the remote apparatus R side includes a MUX 25a and a DEMUX 25b.

In the relay transmission apparatus 24 on the local apparatus L side, an input side of the MUX 24a is connected to the first TX 36a through a single mode optical fiber transmitting only the 1 PPS signal (pulse signal P1) of wavelength $\lambda_1$, and to the first TX 37a through a single mode optical fiber transmitting only the 1 PPS signal (pulse signal P2) of wavelength $\lambda_2$ different from the wavelength $\lambda_1$. Furthermore, the input side of the MUX 24a is connected to an optical fiber extending from a user apparatus (not illustrated) that transmits a main signal as an optical signal that is a user data. In other words, the MUX 24a multiplexes the pulse signals P1 and P2 and the main signal to transmit the multiplexed resultant to the first optical fiber F1.

An output side of the DEMUX 24b is connected to the first RX 38a through a single mode optical fiber transmitting the pulse signals P1 and P4 of wavelength $\lambda_1$ and to the first RX 39a through a single mode optical fiber transmitting the pulse signals P3 and P2 of wavelength $\lambda_2$, and further connected with an optical fiber transmitting the main signal to the user apparatus. In other words, the DEMUX 24b demultiplexes the pulse signals P1 and P3, and P4 and P2 received through the second optical fiber F2 and the main signal to transmit the demultiplexed resultants to the first RX 38a, the first RX 39a, and the user apparatus.

In the relay transmission apparatus 25 on the remote apparatus R side, an output side of the DEMUX 25b is connected to the first RX 38b through a single mode optical fiber transmitting only the pulse signal P1 of wavelength $\lambda_1$ and to the second RX 39b through a single mode optical fiber transmitting only the pulse signal P2 of wavelength $\lambda_2$, and further connected with an optical fiber transmitting the main signal to the user apparatus (not illustrated). In other words, the DEMUX 25b demultiplexes the pulse signals P1 and P2, and the main signal received through the first optical fiber F1 to transmit the demultiplexed resultants to the first RX 38b, the second RX 39b, and the user apparatus.

An input side of the MUX 25a is connected to the first TX 36b through a single mode optical fiber transmitting the pulse signals P1 and P4 of wavelength $\lambda_1$ and the second TX 37b through a single mode optical fiber transmitting the pulse signals P3 and P2 of wavelength $\lambda_2$, and further connected with an optical fiber transmitting the main signal. Here, the MUX 25a multiplexes the pulse signals P1 and P4, and P3 and P2, and the main signal to transmit the multiplexed resultant to the second optical fiber F2.

Both end sides of the relay transmission apparatus 24 including the MUX 24a and the DEMUX 24b connected in this manner are provided with connectors, one of which connectors is plugged into and connected to a connector of the optical fibers F1 and F2. The other connector is connected to a connector of a single mode optical fiber connected to the local apparatus L by a connector or the like.

Both end sides of the relay transmission apparatus 25 including the MUX 25a and the DEMUX 25b are also provided with connectors. One connector is plugged into and connected to the connector of the optical fibers F1 and F2. The other connector is connected to a connector of a single mode optical fiber connected to the remote apparatus R by a connector or the like.

Next, in the local apparatus L, the GPS reception unit 31 sets 1 PPS signal of 1 PPS/ToD (Time of Day) received by the GM 31b via the GPS antenna 31a as a reference timing of time. The GPS reception unit 31 outputs a 1 PPS signal 51 set as the reference timing to the delay amount calculating unit 33 and the delay control unit 35.

The fixed delay amount information holding unit 32 holds a fixed delay amount in the first optical fiber F1 and a fixed delay amount in the second optical fiber F2 serving as a reference of a system design. The fixed delay amount information holding unit 32 holds information on the fixed delay amount, serving as a reference, between the components of the time synchronization system 20.

At a beginning, the delay amount calculating unit 33 synchronizes the fixed delay amount τ1, serving as a reference, of the propagation delay time in the first optical fiber F1 with the 1 PPS signal 51 and outputs the resultant to the time management unit 34. The delay amount calculating unit 33 substitutes the propagation times $t_{p1}$ and $t_{p4}$ of the pulse signals P1 and P4 received by the first RX 38a (see FIG. 2) and the propagation times $t_{p3}$ and $t_{p2}$ of the pulse signals P3 and P2 received by the second RX 39a during the operation after the beginning in the above Expression (1) to determine the propagation delay amount τ1 in the first optical fiber F1 (see FIG. 2). The determined propagation delay amount τ1 is synchronized with the 1 PPS signal 51 from the GPS reception unit 31 and output to the time management unit 34.

The time management unit 34 holds the fixed delay amount τ1 in the first optical fiber F1 at the beginning, and outputs the held fixed delay amount τ1 to the delay control unit 35. During the operation, the time management unit 34 holds the calculated propagation delay amount τ1 in the first optical fiber F1 and outputs the held propagation delay amount τ1 to the delay control unit 35.

In a case where the reference fixed delay amount τ1 is supplied from the time management unit 34 at the beginning, the delay control unit 35 outputs a time difference td as zero between transmission timings of the first pulse signal P1 transmitted from the first TX 36a and the second pulse signal P2 transmitted from the second TX 37a to the first TX 36a and the second TX 37a.

Additionally, during the operation, the delay control unit 35 sequentially holds the propagation delay amounts τ1 sequentially supplied from the time management unit 34, and sets the time difference td corresponding to a difference between the current and last held propagation delay amounts τ1 so that the difference is zero and outputs the set time difference td to the first TX 36a and the second TX 37a.

While transiting from the beginning to the operation, the delay control unit 35 outputs the time difference td to the first TX 36a and the second TX 37a, the time difference td corresponding to a difference between the currently calculated propagation delay amount τ1 (e.g., "12") and the last reference fixed delay amount τ1 (e.g., "10"), specifically, the time difference td is (12−10=+2). In this case, since the current propagation delay amount τ1 is increased by "2" more than the reference fixed delay amount τ1, the first TX 36a and the second TX 37a transmit the pulse signals P1 and P2 with the transmission time difference between the pulse signals P1 and P2 being decreased by "2".

In a case where a value of the last propagation delay amount τ1 is "10" and a current value is "9", the time difference td is set to 9−10=−1. In this case, since the current propagation delay amount τ1 is decreased by "1" less than the last time, the first TX 36a and the second TX 37a transmit with the transmission time difference between the pulse signals P1 and P2 being increased by "1".

The first TX 36a includes an E/O (electrical/optical) converter, which is not illustrated, and converts the pulse signal P1 of wavelength $\lambda_1$ that is an electrical signal into an optical signal by E/O processing and then transmits the resultant optical signal to the MUX 24a.

The second TX 37a includes an E/O converter, and converts the pulse signal P2 of wavelength $\lambda_2$ that is an electrical signal into an optical signal and then transmits the resultant optical signal to the MUX 24a, and transmits this transmission timing as the time difference td.

The MUX 24a multiplexes the optical signals as the pulse signal P1 of wavelength $\lambda_1$ and the pulse signal P2 of wavelength $\lambda_2$, and the main signal to transmit the multiplexed signal to the remote apparatus R through the first optical fiber F1.

The DEMUX 25b on the remote apparatus R side demultiplexes the pulse signals P1 and P2 and the main signal transmitted through the first optical fiber F1 for each wavelength, and outputs the pulse signal P1 of wavelength $\lambda_1$ to the first RX 38b, outputs the pulse signal P2 of wavelength $\lambda_2$ to the second RX 39b, and outputs the main signal to the user apparatus (not illustrated).

The first TX 38b and the second TX 39b include O/E (optical/electrical) converters, and convert the pulse signals P1 and P2 that are optical signals into the electrical signals by O/E conversion processing, and then output the resultant electrical signals to the first TX 36b and the second TX 37b, and to the filter 45.

The filter 45 passes only the pulse signal P1 of wavelength $\lambda_1$ to output to the local apparatus side of the latter stage, which is not illustrated.

The first TX 36b and the second TX 37b include E/O (electrical/optical) converters that convert electrical signals into optical signals.

The second TX 37b, when supplied with the pulse signal P1 of wavelength $\lambda_1$ identical to the one that is input to the first TX 36b (at the time t1 in FIG. 2), generates the pulse signal P3 of wavelength $\lambda_2$. After this generation, the first TX 36b and the second TX 37b convert the pulse signals P1 and P3, respectively, that are electrical signals, into optical signals, and then, simultaneously output the resultant optical signals to the MUX 25a at the time t1a (see FIG. 2).

The first TX 36b, when supplied with the pulse signal P2 of wavelength $\lambda_2$ identical to the one that is input to the second TX 37b (at the time t2 in FIG. 2), generates the pulse signal P4 of wavelength $\lambda_1$. After this generation, the first TX 36b and the second TX 37b convert the pulse signals P4 and P2, respectively, that are electrical signals, into optical signals, and then, simultaneously output the resultant optical signals to the MUX 25a at the time t2a (see FIG. 2).

The MUX 25a multiplexes the pulse signals P1 and P3, and P4 and P2, and the main signal that are optical signals to transmit the multiplexed resultant to the local apparatus L through the second optical fiber F2.

The DEMUX 24b on the local apparatus L side demultiplexes the pulse signals P1 to P4 and the main signal transmitted through the second optical fiber F2 for each wavelength, and outputs the pulse signals P1 and P4 of wavelength $\lambda_1$ to the first RX 38a, outputs the pulse signals P3 and P2 of wavelength $\lambda_2$ to the second RX 39a, and outputs the main signal to the user apparatus (not illustrated).

The first RX 38a includes an O/E converter, and converts the pulse signals P1 and P4 that are optical signals into electrical signals, and then, outputs the resultant electrical signals to the delay amount calculating unit 33.

The second RX 39a includes an O/E converter, and converts the pulse signals P3 and P2 that are optical signals into electrical signals, and then, outputs the resultant electrical signals to the delay amount calculating unit 33.

Operation of Embodiment

Next, an operation of the time synchronization process by the time synchronization system 20 according to the present embodiment will be described with reference to flowcharts in FIGS. 3 and 4. Assume that the time synchronization system 20 is initially at a beginning of the time synchronization process. Additionally, description of multiplex and demultiplex of the main signal by the relay transmission apparatuses 24 and 25 is omitted.

Figure 3:
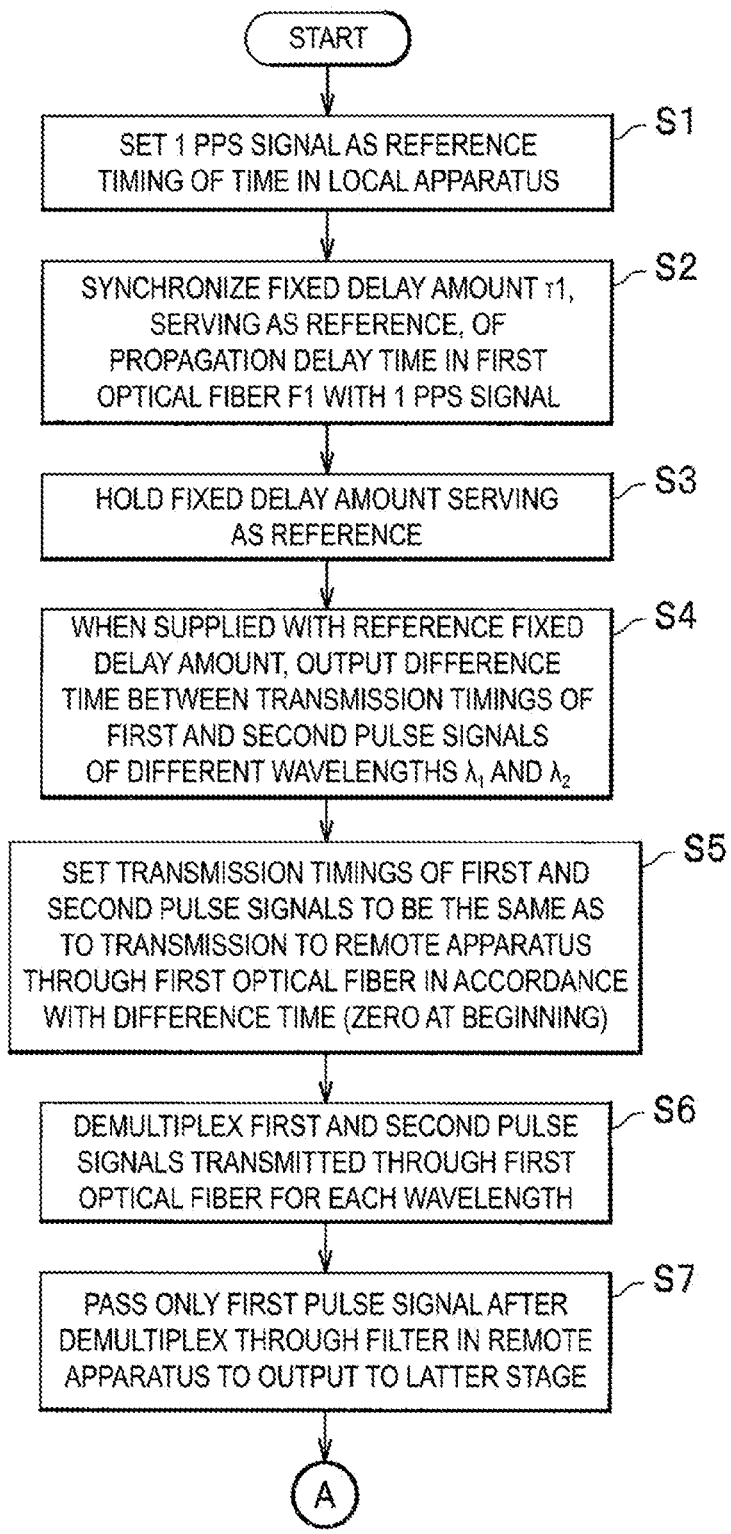
FIG. 3 is a first flowchart for explaining an operation of a time synchronization process by the time synchronization system according to the present embodiment.

At the beginning, in step S1 in FIG. 3, the GPS reception unit 31 sets a 1 PPS signal received via the GPS antenna 31a as the reference timing of time and outputs the 1 PPS signal 51 to the delay amount calculating unit 33 and the delay control unit 35.

In step S2, the delay amount calculating unit 33 synchronizes the fixed delay amount τ1, serving as a reference, of the propagation delay time in the first optical fiber F1 from the holding unit 32 with the 1 PPS signal 51 and outputs the resultant to the time management unit 34.

In step S3, the time management unit 34 holds the fixed delay amount τ1, and outputs the held fixed delay amount τ1 to the delay control unit 35.

In step S4, in a case where the reference fixed delay amount τ1 is supplied from the time management unit 34, the delay control unit 35 outputs a time difference td as zero between transmission timings of the first pulse signal P1 of wavelength $\lambda_1$ transmitted from the first TX 36a and the second pulse signal P2 of wavelength $\lambda_2$ transmitted from the second TX 37a to the first TX 36a and the second TX 37a.

In step S5, the first TX 36a and the second TX 37a E/O converts the first pulse signal P1 and the second pulse signal P2, which are electrical signals, and thereafter, simultaneously transmit the resultant signals to the first optical fiber F1 via the MUX 24a in accordance with the time difference td=zero.

In step S6, the DEMUX 25b on the remote apparatus R side demultiplexes the pulse signals P1 and P2 transmitted through the first optical fiber F1 for each wavelength, and outputs the pulse signal P1 of wavelength $\lambda_1$ to the first RX 38b and outputs the pulse signal P2 of wavelength $\lambda_2$ to the second RX 39b.

In step S7, the first RX 38b and the second RX 39b O/E convert the pulse signals P1 and P2, which are optical signals, and thereafter, output the resultant signals to the first TX 36b and the second TX 37b, and to the filter 45. In step S8, the filter 45 passes only the pulse signal P1 of wavelength $\lambda_1$ to output to the local apparatus side of the latter stage, which is not illustrated.

Figure 4:
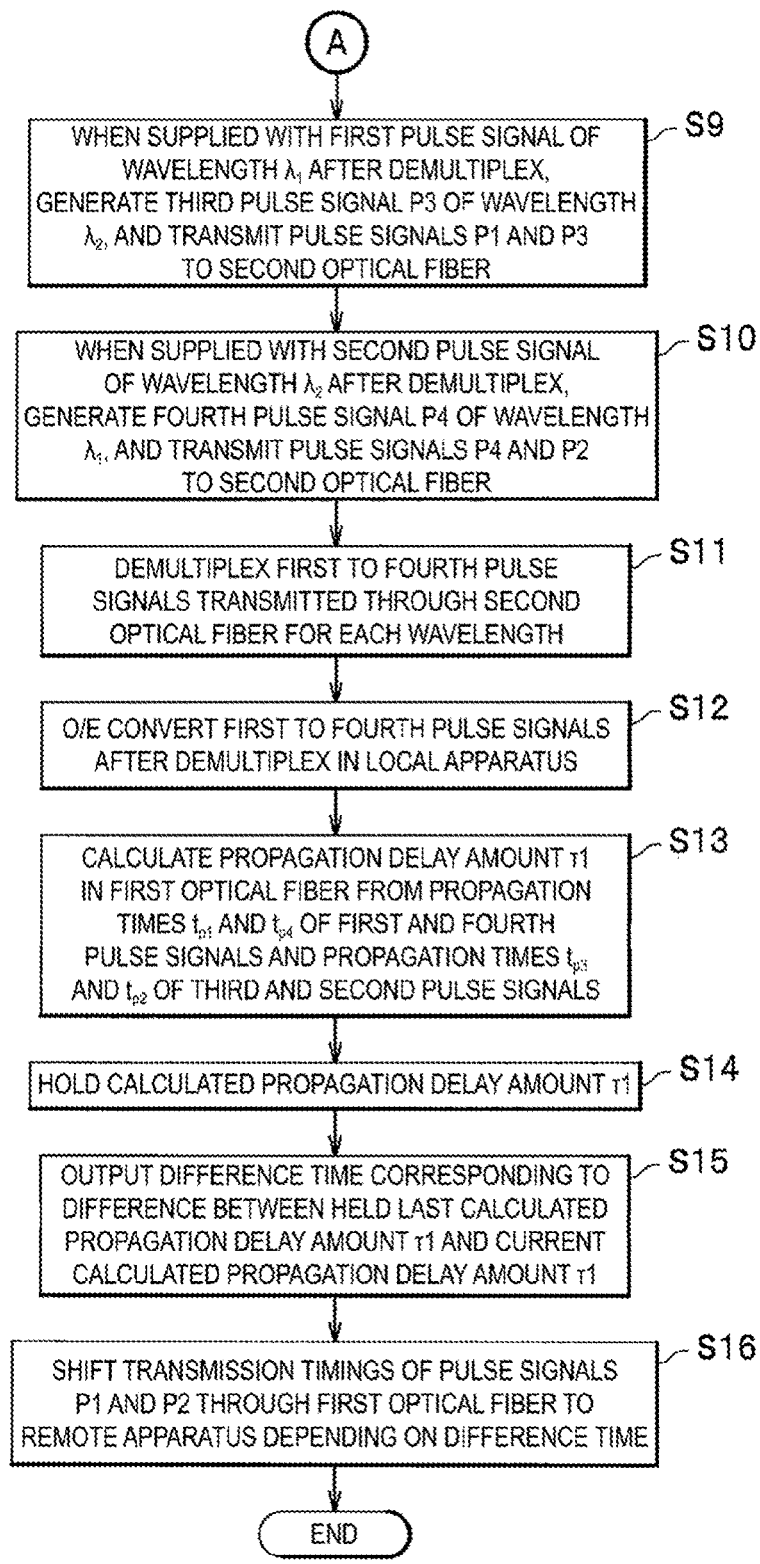
FIG. 4 is a second flowchart for explaining an operation of the time synchronization process by the time synchronization system according to the present embodiment.

In step S9 illustrated in FIG. 4, the second TX 37b, when supplied with the first pulse signal P1 of wavelength $\lambda_1$ identical to the one that is input to the first TX 36b (at the time t1 in FIG. 2), generates the third pulse signal P3 of wavelength $\lambda_2$. After this generation, the first TX 36b and the second TX 37b E/O convert the pulse signals P1 and P3, and then, simultaneously transmit the resultant signals to the second optical fiber F2 via the MUX 25a at the time t1a (see FIG. 2).

After this transmission, in step S10, the first TX 36b, when supplied with the second pulse signal P2 of wavelength $\lambda_2$ identical to the one that is input to the second TX 37b (at the time t2 in FIG. 2), generates the fourth pulse signal P4 of wavelength $\lambda_1$. After this generation, the first TX 36b and the second TX 37b E/O convert the pulse signals P4 and P2, and then, simultaneously transmit the resultant signals to the second optical fiber F2 via the MUX 25a at the time t2a (see FIG. 2).

In step S11, the DEMUX 24b on the local apparatus L side demultiplexes the pulse signals P1 to P4 transmitted through the second optical fiber F2 for each wavelength, and outputs the pulse signals P1 and P4 of wavelength $\lambda_1$ to the first RX 38a and outputs the pulse signals P3 and P2 of wavelength $\lambda_2$ to the second RX 39a.

In step S12, the first RX 38a O/E converts the pulse signals P1 and P4 that are optical signals, the second RX 39a O/E converts the pulse signal P3 and P2 that are optical signals, and then, the first RX 38a and the second RX 39a output the converted resultants to the delay amount calculating unit (also called a calculating unit) 33.

In step S13, the calculating unit 33 sets the reception times of the pulse signals P1 and P4 received by the first RX 38a to the propagation times $t_{p1}$ and $t_{p4}$ (see FIG. 2), respectively, and sets the reception times of the pulse signals P3 and P2 received by the second RX 39a to the propagation times $t_{p3}$ and $t_{p2}$, respectively. Furthermore, the calculating unit 33 substitutes the propagation times $t_{p1}$, $t_{p4}$, $t_{p3}$, and $t_{p2}$ in Expression (1) above to determine the propagation delay amount $\tau 1$ in the first optical fiber F1 (see FIG. 2). Moreover, the calculating unit 33 synchronizes the determined propagation delay amount $\tau 1$ with the 1 PPS signal 51, and output the synchronization resultant to the time management unit 34.

In step S14, the time management unit 34 holds the propagation delay amount $\tau 1$ from the calculating unit 33 and outputs the held propagation delay amount $\tau 1$ to the delay control unit 35.

In step S15, the delay control unit 35 sets the time difference td corresponding to a difference between the last reference fixed delay amount $\tau 1$ (e.g., "10") and the currently calculated propagation delay amount $\tau 1$ (e.g., "12") so that the difference is zero and outputs the set time difference td (+2) to the first TX 36a and the second TX 37a. After this process, the delay control unit 35 sets the time difference td corresponding to a difference between the current and last sequentially calculated propagation delay amounts T1 so that the difference is zero and outputs the set time difference td to the first TX 36a and the second TX 37a.

In step S16, the first TX 36a and the second TX 37a, when supplied with the time difference td, transmit with the transmission timings of the pulse signals P1 and P2 being shifted by the time difference td. For example, the first TX 36a and the second TX 37a, when supplied with the time difference td="+2", transmits with the transmission time difference between the pulse signals P1 and P2 being decreased by "2". In this case, the pulse signals P1 and P2 with the transmission time difference being decreased by "2" are received by the remote apparatus R via the first optical fiber F1 and returned to the local apparatus L via the second optical fiber F2. Thus, the propagation delay time $\tau 1$ in the first optical fiber F1 calculated by the calculating unit 33 from the returned pulse signals P1 to P4 is "10" decreased by "2" as compared to the last time, and is equal to the fixed delay amount $\tau 1$ "10" in step S15 above. This makes the differences between both to be zero.

Effects of Embodiment

Hereinafter, effects of the time synchronization system 20 according to the present embodiment will be described. The time synchronization system 20 transmits and receives a pulse signal at a constant interval at a synchronization timing between the local apparatus L and the remote apparatus R connected through the two-core bidirectional first and second optical fibers F1 and F2 to synchronize time.

(1) The local apparatus L includes the TXs 36a and 37a as a first transmitter and the RXs 38a and 39a as a first receiver. The TXs 36a and 37a transmit the first pulse signal P1 of a first wavelength (wavelength $\lambda_1$) and the second pulse signal P2 of a second wavelength (wavelength $\lambda_2$) different from the first wavelength to the remote apparatus R through the first optical fiber F1. The RXs 38a and 39a receive a plurality of pulse signals including the first and second pulse signals P1 and P2 transmitted from the remote apparatus R through the second optical fiber F2.

The remote apparatus R includes the RXs 38b an 39b as a second receiver and the TXs 36b and 37b as a second transmitter. The RXs 38b and 39b receive the first and second pulse signals P2 from the first optical fiber F1. The RXs 36b and 37b generate the third pulse signal P3 of wavelength identical to the wavelength of the second pulse signal P2 when receiving the first pulse signal P1, and simultaneously the first and third pulse signals P3 to the local apparatus L through the second optical fiber F2. Furthermore, the TXs 36b and 37b generate the fourth pulse signal P4 of wavelength identical to the wavelength of the first pulse signal P1 when receiving the second pulse signal P2, and simultaneously transmit the second and fourth pulse signals P4 to the local apparatus LR through the second optical fiber F2.

The local apparatus L further includes the delay amount calculating unit 33 and the delay control unit 35.

The delay amount calculating unit 33 calculates the propagation delay amount $\tau 1$ in the first optical fiber F1 from the proportional relationship between T1 and T2 and the proportional relationship between $\tau ud$ and $\tau 1$, where T1 represents the propagation delay time difference between the first pulse signal P1 and the fourth pulse signal P4 of the identical first wavelength received by the RXs 38a and 39a, T2 represents the propagation delay time difference between the first pulse signal P1 of the first wavelength and the third pulse signal P3 of the second wavelength different from the first wavelength, $\tau ud$ represents the round-trip delay time in the first and second optical fibers F1 and F2, and T1 represents the propagation delay amount in the first optical fiber F1.

The delay control unit 35 controls such that the first pulse signal P1 and the second pulse signal P2 are transmitted from the TXs 36a and 37a with the time difference td corresponding to a difference between the current and last calculated propagation delay amounts T1 being set so that the difference is zero.

According to this configuration, the first and fourth pulse signals P4 of the identical first wavelength received through the second optical fiber F2 in the local apparatus L are equal to each other in the propagation delay amount in the second optical fiber F2, and thus, is equal to the propagation delay time difference T1 between the first and second pulse signals P2 of which propagations are delayed in the first optical fiber F1. On the other hand, both the first pulse signal P1 of the first wavelength and the third pulse signal P3 of the second wavelength different from the first wavelength are simultaneously transmitted from the second communication apparatus, and thus, the reception time difference between the both signals is the propagation delay time difference T2 between both in the second optical fiber F2.

The propagation delay amount $\tau 1$ in the first optical fiber F1 is calculated from a proportional relationship between T1 and T2, and a proportional relationship between $\tau ud$ and $\tau 1$, that is, $\tau 1 = \{T1/(T1+T2)\} \times \tau ud$. When the first pulse signal P1 and the second pulse signal P2 are transmitted in the first optical fiber F1 with the time difference corresponding to a difference between the current and last calculated propagation delay amounts $\tau 1$ so that the difference is zero, corrected is the deviation in the reception synchronization timing due to the propagation delay amount in the first optical fiber F1 in the second communication apparatus. This allows the timings of transmitting and receiving the pulse signal (1 PPS signal) at a constant interval to be synchronized between the local apparatus L and the remote apparatus R even in a case where the first optical fiber F1 connecting the local apparatus L and the remote apparatus R fluctuates in an optical characteristic and an optical fiber length.

In addition, since the above synchronization can be achieved using existing two-core optical fibers F1 and F2, costs can be reduced compared to known techniques that occupy the one-core optical fiber for a time synchronization process. Specifically, the time synchronization process is difficult to apply between stations already depleted of the one-core optical fiber, and therefore, an optical fiber for new time synchronization process is required. Here, according to the present invention, the existing two-core optical fibers F1 and F2 can be used to perform time synchronization process, which makes it possible to reduce the costs.

(2) The delay control unit 35 controls the first and second pulse signals P2 to be simultaneously transmitted to the first optical fiber F1 at the beginning of transmitting and receiving the pulse signal between the local apparatus L and the remote apparatus R, and controls the first pulse signal P1 and the second pulse signal P2 to be transmitted with the time difference corresponding to a difference so that the difference is zero, the difference being between the propagation delay amount $\tau 1$ in the first optical fiber F1 calculated by the calculating unit 33 in accordance with the former control and the predetermined propagation delay amount $\tau 1$, serving as a reference, in the first optical fiber F1.

According to this configuration, at the beginning of the time synchronization process, the propagation delay amount $\tau 1$ in the first optical fiber F1 is calculated using the first and second pulse signals P2 transmitted from the local apparatus L with a difference of 0, and the third and fourth pulse signals P3 generated in the remote apparatus R. The first and second pulse signals P2 are transmitted from the local apparatus L with the time difference corresponding to a difference between the calculated propagation delay amount $\tau 1$ and the reference propagation delay amount $\tau 1$ in the first optical fiber F1 so that the difference is zero. Thus, the time synchronization process for the transmission and reception between the local apparatus L and the remote apparatus R can be appropriately performed after the beginning.

Detailed Delay in the Embodiment

Next, the detailed delay in the apparatus in the time synchronization system 20 will be described with reference to FIG. 5.

Figure 5:
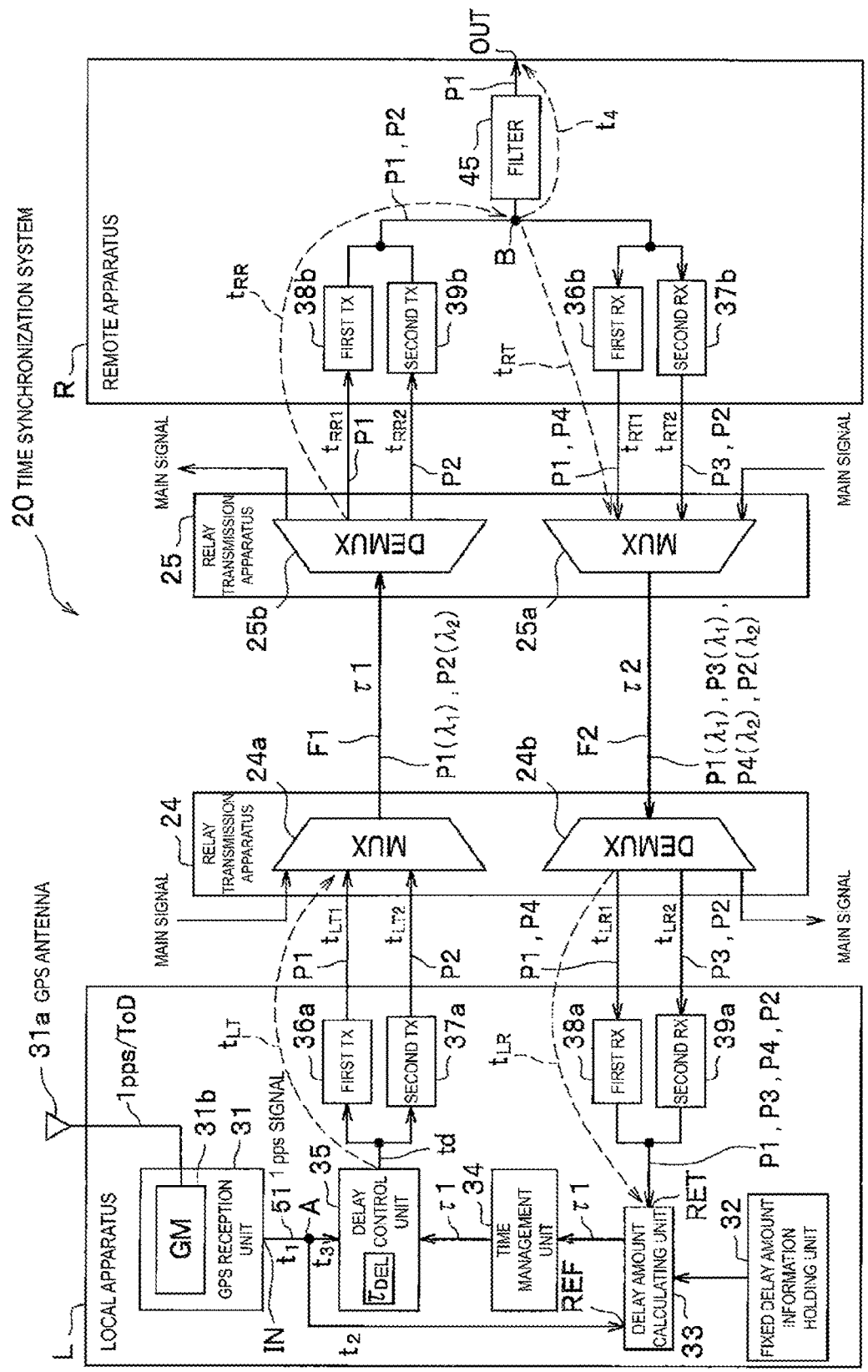
FIG. 5 is a block diagram illustrating a detailed delay in the apparatus in the time synchronization system.

As illustrated in FIG. 5, assume that an out end of the GPS reception unit 31 is IN, a bifurcation point between the GPS reception unit 31 and the delay control unit 35 is A, a delay time from IN to A is $t_1$, a delay time from A to the delay control unit 35 is $t_3$, and a delay time from A to an input end REF of the delay amount calculating unit 33 is $t_2$.

Assume that a delay due to a difference obtained in the delay control unit 35 is $\tau_{DEL}$. Assume that a delay time from the delay control unit 35 to an input end of the MUX 24a via the TX 36a or the TX 37a is $t_{LT}$. Here, assume that a delay time from the first TX 36a to the MUX 24a is $t_{LT1}$, and a delay time from the second TX 37a to the MUX 24a indicated by a wavy line arrow is $t_{LT2}$. $\tau 1$ represents the propagation delay time of the pulse signal in the first optical fiber F1.

Assume that a connection point is B, in the remote apparatus R, between three of an output end to which the RX 38b and the RX 39b are connected, an output end to which the TX 36b and the TX 37b are connected, and an input end of the filter 45. Assume that a delay time from an output end of the DEMUX 25b to B via the RX 38b or 39b as indicated by a wavy line arrow is $t_{RR}$. Here, assume that a delay time from the DEMUX 25b to the first RX 38b is $t_{RR1}$, and a delay time from the DEMUX 25b to the second RX 39b is $t_{RR2}$. Assume that a delay time from B to an output end OUT of the remote apparatus R via the filter 45 indicated by a wavy line arrow is $t_4$.

Assume that a delay time from B to an input end of the MUX 25a via the TX 36b or 37b indicated by a wavy line arrow is $t_{RT}$. Assume that a delay time from the first TX 36b to the MUX 25a is $t_{RT1}$ and a delay time from the second TX 37b and the MUX 25a is $t_{RT2}$. Here, $\tau 2$ represents the propagation delay time of the pulse signal in the second optical fiber F2.

A delay time from an output end of the DEMUX 24b on the local apparatus L side to an input end RET of the calculating unit 33 via the RX 38a or the RX 39a indicated by a wave line arrow is $t_{LR}$. Here, assume that a delay time from the DEMUX 24b to the first RX 38a is $t_{LR1}$, and a delay time from the DEMUX 24b to the second RX 39a is $t_{LR2}$.

Figure 6:
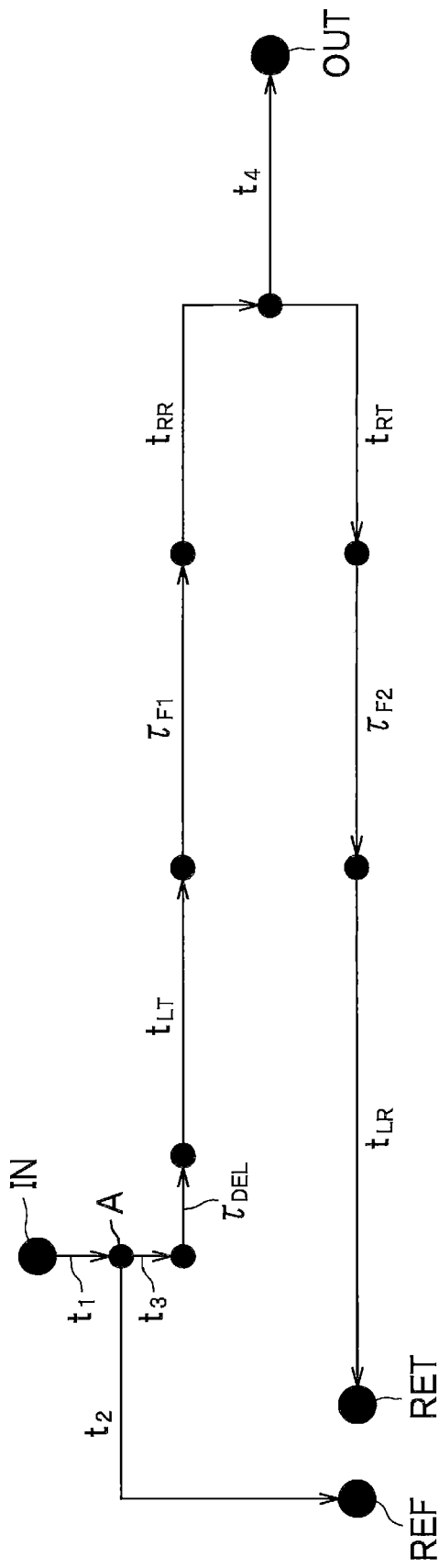
FIG. 6 is a model diagram of the detailed delay in the apparatus in the time synchronization system.
Figure 7:
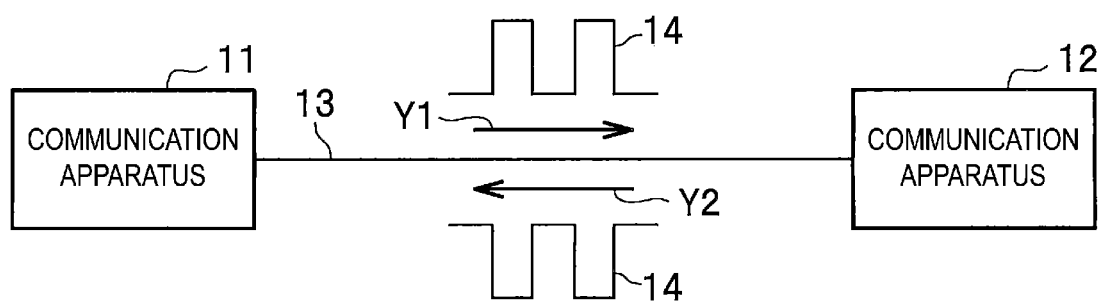
FIG. 7 is a system diagram of each communication apparatus connected by a one-core optical fiber of the related art.
Figure 8:
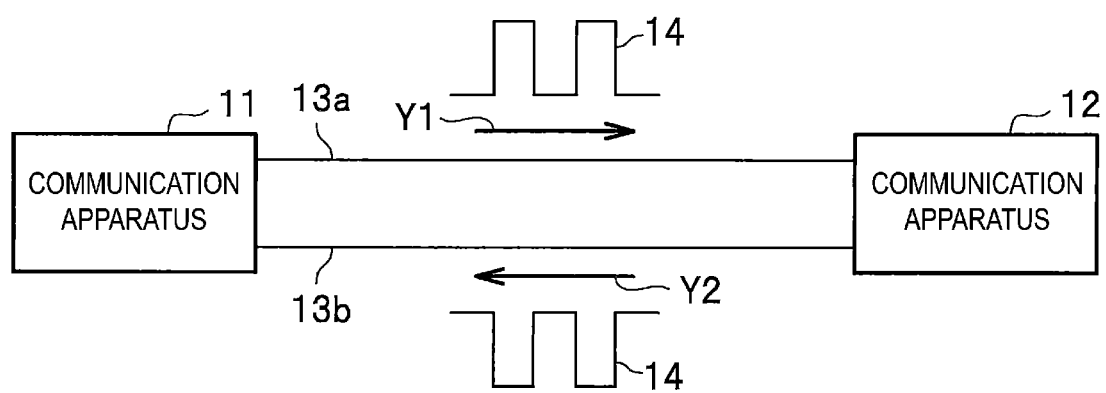
FIG. 8 is a system diagram of each communication apparatus connected by a two-core bidirectional optical fiber of the related art.

Such delay times can be expressed as in a delay model diagram illustrated in FIG. 6. As illustrated in FIG. 5 or FIG. 6, $\tau_{IN \to OUT}$ is expressed by Equation (5) below.

[Expression 3]

$$\tau_{IN \to OUT} = \tau_{IN \to REF} + \tau_{REF \to RET} - \tau_2 - t_{RT} - t_{LR} + t_4 \quad (5)$$

Also, $\tau_{IN \to OUT}$ in Equation (5) above can be expressed by Equation (6) below.

[Expression 4]

$$\tau_{IN \to OUT} = t_1 + t_3 + \tau_{DEL} + t_{LT} + \tau_1 + t_{RR} + t_4 \quad (6)$$

$\tau_{IN \to REF}$ in Equation (5) above is expressed by Equation (7) below.

[Expression 5]

$$\tau_{IN \to REF} = t_1 + t_2 \quad (7)$$

$\tau_{REF \to RET}$ in Equation (5) above is expressed by Equation (8) below.

[Expression 6]

$$\tau_{REF \to RET} = -t_2 + t_3 + \tau_{DEL} + t_{LT} + \tau 1 + t_{RR} + t_{RT} + \tau 2 + t_{LR} \quad (8)$$

As expressed by $\tau_{IN \to OUT}$ in Equation (5) above, by controlling the delay time from the IN of the GPS reception unit 31 to OUT of the remote apparatus R through the first optical fiber F1 to be constant, the difference between the current and last propagation delay amounts τ1 in the first optical fiber F1 can be controlled to be zero as described above. Note that by adding the delay time from IN to OUT, a round-trip delay between the remote apparatus R and the local apparatus L is obtained.

Example of Delay Calculation in Embodiment

Next, a calculation example in the delay amount calculating unit 33 will be described.

The propagation times (referred to as the propagation delay times) of the pulse signals P1 to P4 transmitted from the remote apparatus R and received at the local apparatus L illustrated in FIG. 2 are denoted by $t_{p1}$ for the pulse signal P1, $t_{p3}$ for the pulse signal P3, and $t_{p4}$ for the pulse signal P4.

The propagation time to is expressed by Equation (9) below.

$$t_{p1} = \tau_{11} + \tau_{21} \quad (9)$$

where a numerical value on the left side of the τ11 represents the number of optical fiber cores 1 or 2, and the numerical value on the right side represents the wavelength $\lambda_1$ or $\lambda_2$. $\tau_{11}$ indicates that the number of τ cores is 1 and the wavelength is $\lambda_1$.

The propagation time $t_{p3}$ is expressed by Equation (10) below.

$$t_{p3} = \tau_{11} + \tau_{22} \quad (10)$$

The propagation time $t_{p4}$ is expressed by Equation (11) below.

$$t_{p4} = \tau_{12} + \tau_{21} \quad (11)$$

How much delay difference is present in the first optical fiber F1 due to the wavelength $\lambda_1$ or $\lambda_2$ is expressed by Equation (12) below. How much delay difference is present in the second optical fiber F2 due to the wavelength $\lambda_1$ or $\lambda_2$ is expressed by Equation (13) below. Here, the $D_1$ is a monochromatic dispersion coefficient of the first optical fiber F1 that is a coefficient representing how much deviation is present when the wavelength difference and the length of the core wire are multiplied. $D_2$ is a monochromatic dispersion coefficient of the second optical fiber F2.

[Expression 7]

$$\tau_{11} - \tau_{12} = D_1 \cdot l_1 \cdot (\lambda_1 - \lambda_2) \quad (12)$$

$$\tau_{21} - \tau_{22} = D_2 \cdot l_2 \cdot (\lambda_1 - \lambda_2) \quad (13)$$

Note that the propagation times $t_{p1}$, $t_{p3}$, and $t_{p4}$ expressed by Equations (9) to (11) above taking into consideration effects of polarization dispersion in the optical fibers F1 and F2 ($\tau_{PMD1}$ represents the effect in the first optical fiber F1 and $\tau_{PMD2}$ represents the effect in the second optical fiber F2) and the effects of the Sagnac effect ($\tau_s$) are expressed by Equations (14) to (16) below.

[Expression 8]

$$t_{P1} = (\tau_{11} \pm \tau_{PMD1} \pm \tau_S) + (\tau_{21} \pm \tau_{PMD2} \pm \tau_S) \quad (14)$$

$$t_{P3} = (\tau_{11} \pm \tau_{PMD1} \pm \tau_S) + (\tau_{22} \pm \tau_{PMD2} \pm \tau_S) \quad (15)$$

$$t_{P4} = (\tau_{12} \pm \tau_{PMD1} \pm \tau_S) + (\tau_{21} \pm \tau_{PMD2} \pm \tau_S) \quad (16)$$

The propagation delay time difference T1 in the first optical fiber F1 is expressed by Equation (17) below.

[Expression 9]

$$t_{P4} - t_{P1} = \tau_{12} - \tau_{11} = -D_1 \cdot l_1 \cdot (\lambda_1 - \lambda_2) \quad (17)$$

The propagation delay time difference T2 in the second optical fiber F2 is expressed by Equation (18) below.

[Expression 10]

$$t_{P3} - t_{P1} = \tau_{22} - \tau_{21} = -D_2 \cdot l_2 \cdot (\lambda_1 - \lambda_2) \quad (18)$$

The ratio between the propagation delay time differences T1 and T2 in the optical fibers F1 and F2 is expressed by Equation (19) below.

[Expression 11]

$$\frac{t_{P4} - t_{P1}}{t_{P3} - t_{P1}} = \frac{-\left(D_1 + \frac{dD_1}{dT}\right) \cdot \left(l_1 + \frac{dl_1}{dT}\right) \cdot (\lambda_1 - \lambda_2)_{LR}}{-\left(D_2 + \frac{dD_2}{dT}\right) \cdot \left(l_2 + \frac{dl_2}{dT}\right) \cdot (\lambda_1 - \lambda_2)_{RL}} = \frac{\left(D_1 + \frac{dD_1}{dT}\right)}{\left(D_2 + \frac{dD_2}{dT}\right)} \cdot \frac{(\lambda_1 - \lambda_2)_{LR}}{(\lambda_1 - \lambda_2)_{RL}} \cdot \frac{\left(l_1 + \frac{dl_1}{dT}\right)}{\left(l_2 + \frac{dl_2}{dT}\right)} \quad (19)$$

In Equation (19), an effect of time variation $dl_1/dT$ is added to a length $l_1$ in the first optical fiber F1 in Equation (17) above to obtain $l_1 + dl1/dT$, and an effect of time variation $dl_2/dT$ is added to a length $l_2$ in the second optical fiber F2 in Equation (12) above to obtain $12 + dl1/dT$. The ratio between the propagation delay time differences T1 and T2 means variation depending on the ratio of time, and thus, means that the propagation delay amounts τ1 and τ2 change depending on a change in temperatures of the optical fibers F1 and F2.

The ratio between the length $l_1$ and $l_2$ of the optical fibers F1 and F2 is expressed by Equation (20) below.

[Expression 12]

$$\frac{\left(l_1 + \frac{dl_1}{dT}\right)}{\left(l_2 + \frac{dl_2}{dT}\right)} = \frac{(\lambda_1 - \lambda_2)_{RL}}{(\lambda_1 - \lambda_2)_{LR}} \cdot \frac{\left(D_2 + \frac{dD_2}{dT}\right)}{\left(D_1 + \frac{dD_1}{dT}\right)} \cdot \frac{t_{P4} - t_{P1}}{t_{P3} - t_{P1}} \quad (20)$$

The ratio between the refractive indexes $\tau_{11}$ and $\tau_{21}$ of the optical fibers F1 and F2 using the ratio between the lengths $l_1$ and $l_2$ in Equation (20) above is expressed by Equation (21) below. Here, the refractive index n is also expressed by Expression (1) above.

[Expression 13]

$$\frac{\tau_{11}}{\tau_{21}} = \frac{\frac{\left(n_{11}+\frac{dn_{11}}{dT}\right)\left(l_1+\frac{dl_1}{dT}\right)}{C}}{\frac{\left(n_{21}+\frac{dn_{21}}{dT}\right)\left(l_2+\frac{dl_2}{dT}\right)}{C}} = \frac{\left(n_{11}+\frac{dn_{11}}{dT}\right)}{\left(n_{21}+\frac{dn_{21}}{dT}\right)} \cdot \frac{\left(l_1+\frac{dl_1}{dT}\right)}{\left(l_2+\frac{dl_2}{dT}\right)} = \qquad (21)$$

$$\frac{\left(n_{11}+\frac{dn_{11}}{dT}\right)}{\left(n_{21}+\frac{dn_{21}}{dT}\right)} \cdot \frac{(\lambda_1-\lambda_2)_{RL}}{(\lambda_1-\lambda_2)_{LR}} \cdot \frac{\left(D_2+\frac{dD_2}{dT}\right)}{\left(D_1+\frac{dD_1}{dT}\right)} \cdot \frac{t_{P4}-t_{P1}}{t_{P3}-t_{P1}}$$

The round-trip propagation delay time τcud between the local apparatus L and the remote apparatus R focusing on the first pulse signal P1 is expressed by Equation (22) below, where τud is from $t_0$ to the time $t_{P1}$ in FIG. 2.

[Expression 14]

$$t_{P1} = \tau_{11} + \qquad (22)$$

$$\tau_{21}\left(1+\frac{\left(n_{11}+\frac{dn_{11}}{dT}\right)}{\left(n_{21}+\frac{dn_{21}}{dT}\right)} \cdot \frac{(\lambda_1-\lambda_2)_{RL}}{(\lambda_1-\lambda_2)_{LR}} \cdot \frac{\left(D_2+\frac{dD_2}{dT}\right)}{\left(D_1+\frac{dD_1}{dT}\right)} \cdot \frac{t_{P4}-t_{P1}}{t_{P3}-t_{P1}}\right)\tau_{21}$$

The return-trip propagation delay time τ21 in the second optical fiber F2 between the local apparatus L and the remote apparatus R is expressed by Equation (23) below where the above Equation (22) has been deformed.

[Expression 15]

$$\tau_{21} = \frac{t_{P1}}{1+\frac{\left(n_{11}+\frac{dn_{11}}{dT}\right)}{\left(n_{21}+\frac{dn_{21}}{dT}\right)} \cdot \frac{(\lambda_1-\lambda_2)_{RL}}{(\lambda_1-\lambda_2)_{LR}} \cdot \frac{\left(D_2+\frac{dD_2}{dT}\right)}{\left(D_1+\frac{dD_1}{dT}\right)} \cdot \frac{t_{P4}-t_{P1}}{t_{P3}-t_{P1}}} \qquad (23)$$

Assume that the wavelength differences, the wavelength dispersion coefficients, and the refractive indexes are equal between the optical fibers F1 and F2, the propagation delay time $\tau_{21}$ in the second optical fiber F2 is expressed by Equation (24) below.

[Expression 16]

$$\tau_{21} = \frac{t_{P1}}{1+\frac{t_{P4}-t_{P1}}{t_{P3}-t_{P1}}} \qquad (24)$$

In addition, when an expected value of the time deviation due to random variation caused by polarization dispersion is assumed to be 0, the propagation delay time $\tau_{21}$ in the second optical fiber F2 is expressed by Equation (25) below.

[Expression 17]

$$\tau_{21} = \frac{t_{P1}}{1+\frac{t_{P4}-t_{P1}}{t_{P3}-t_{P1}}} = \frac{t_{P3}-t_{P1}}{-2t_{P1}+t_{P3}+t_{P4}} \qquad (25)$$

An outward-trip propagation delay time $\tau_{11}$ in the first optical fiber F1 between the local apparatus L and the remote apparatus R is expressed by Equation (26).

[Expression 18]

$$\tau_{11} = \frac{t_{P4}-t_{P1}}{-2t_{P1}+t_{P3}+t_{P4S}} \qquad (26)$$

Accordingly, the round-trip propagation delay time between the local apparatus L and the remote apparatus R is τud=$\tau_{21}$+$\tau_{11}$.

The specific configuration can be changed as appropriate without departing from the gist of the present invention.

REFERENCE SIGNS LIST

20 Time synchronization system
24, 25 Relay transmission apparatus
24a, 25 MUX
24b, 25b DEMUX
30 Local apparatus (first communication apparatus)
31 GPS reception unit
32 Fixed delay amount information holding unit (holding unit)
33 Delay amount calculating unit (calculating unit)
34 Time management unit
35 Delay control unit (control unit)
36a First TX
37a Second TX
38a First RX
39a Second RX
36b First TX
37b Second TX
38b First RX
39b Second RX
40 Remote apparatus (second communication apparatus)
45 Filter
L Local apparatus (first communication apparatus)
R Remote apparatus (second communication apparatus)
F1 First optical fiber
F2 Second optical fiber
P1 First pulse signal of wavelength $\lambda_1$
P2 Second pulse signal of wavelength $\lambda_2$
P3 Third pulse signal of wavelength $\lambda_2$
P4 Fourth pulse signal of wavelength $\lambda_1$

The invention claimed is:

1. A time synchronization system for transmitting and receiving a pulse signal at a constant interval at a synchronization timing between first and second communication apparatuses connected through a first optical fiber and a second optical fiber, which are two-core bidirectional, to synchronize time, the time synchronization system comprising:
the first communication apparatus that includes
a first transmitter configured to transmit a first pulse signal of a first wavelength and a second pulse signal of a second wavelength different from the first wavelength to the second communication apparatus through the first optical fiber, and a first receiver configured to receive a plurality of pulse signals including the first pulse signal and the second pulse signal transmitted from the second communication apparatus through the second optical fiber; and the second communication apparatus that includes a second receiver configured to receive the first pulse signal and the second pulse signal from the first optical fiber, and a second transmitter configured to generate a third pulse signal of a wavelength identical to the second wavelength of the second pulse signal when receiving the first pulse signal, to simultaneously transmit the first pulse signal and the third pulse signal to the first communication apparatus through the second optical fiber, to generate a fourth pulse signal of a wavelength identical to the first wavelength of the first pulse signal when receiving the second pulse signal, and to simultaneously transmit the second pulse signal and the fourth pulse signal to the first communication apparatus through the second optical fiber, wherein the first communication apparatus further includes a calculating unit, including one or more processors, configured to calculate a propagation delay amount in the first optical fiber from a first proportional relationship between a first propagation delay time difference between the first pulse signal and the fourth pulse signal of the identical first wavelength received by the first receiver and a second propagation delay time difference between the first pulse signal of the first wavelength and the third pulse signal of the second wavelength that is different from the first wavelength, and a second proportional relationship between a round-trip delay time in the first and second optical fibers and the propagation delay amount in the first optical fiber, and a control unit, including one or more processors, configured to control the first pulse signal and the second pulse signal to be transmitted from the first transmitter with a time difference corresponding to a difference between current and last values of the calculated propagation delay amounts such that the difference is zero.

2. The time synchronization system according to claim 1, wherein the control unit performs a first control of the first pulse signal and the second pulse signal to be simultaneously transmitted to the first optical fiber at a beginning of transmitting and receiving the first and second pulse signals between the first and second communication apparatuses, and performs a second control of the first pulse signal and the second pulse signal to be transmitted with a time difference corresponding to a difference between the propagation delay amount in the first optical fiber calculated by the calculating unit according to the first control, and a predetermined propagation delay amount, serving as a reference, in the first optical fiber such that the difference is zero.

3. A time synchronization method by a time synchronization system for transmitting and receiving a pulse signal at a constant interval at a synchronization timing between first and second communication apparatuses connected through a first optical fiber and a second optical fiber, which are two-core bidirectional, to synchronize time, the time synchronization method comprising:

transmitting, from the first communication apparatus, a first pulse signal of a first wavelength and a second pulse signal of a second wavelength different from the first wavelength to the second communication apparatus through the first optical fiber;

receiving, at the second communication apparatus, the first pulse signal and the second pulse signal from the first optical fiber;

generating a third pulse signal of a wavelength identical to the second wavelength of the second pulse signal when receiving the first pulse signal, and simultaneously transmitting the first pulse signal and the third pulse signal to the first communication apparatus through the second optical fiber;

generating a fourth pulse signal of a wavelength identical to the first wavelength of the first pulse signal when receiving the second pulse signal, and simultaneously transmitting the second pulse signal and the fourth pulse signal to the first communication apparatus through the second optical fiber;

receiving the first to fourth pulse signals from the second optical fiber at the first communication apparatus;

calculating a propagation delay amount in the first optical fiber from a first proportional relationship between a first propagation delay time difference between the first pulse signal and the fourth pulse signal of the identical first wavelength among the received first to fourth pulse signals and a second propagation delay time difference between the first pulse signal of the first wavelength and the third pulse signal of the second wavelength that is different from the first wavelength, and a second proportional relationship between a round-trip delay time in the first and second optical fibers and the propagation delay amount in the first optical fiber; and controlling the first pulse signal and the second pulse signal to be transmitted to the second communication apparatus with a time difference corresponding to a difference between current and last values of the calculated propagation delay amounts such that the difference is zero.

4. The time synchronization method according to claim 3, further comprising:

performing a first control of the first pulse signal and the second pulse signal to be simultaneously transmitted to the first optical fiber at a beginning of transmitting and receiving the first and second pulse signals between the first and second communication apparatuses, and performing a second control of the first pulse signal and the second pulse signal to be transmitted with a time difference corresponding to a difference between the propagation delay amount in the first optical fiber calculated according to the first control, and a predetermined propagation delay amount, serving as a reference, in the first optical fiber such that the difference is zero.

\* \* \* \* \*